(12) United States Patent
Eglin et al.

(10) Patent No.: US 11,608,166 B2
(45) Date of Patent: Mar. 21, 2023

(54) METHOD OF CONTROLLING PROPELLERS OF A HYBRID HELICOPTER, AND A HYBRID HELICOPTER

(71) Applicant: AIRBUS HELICOPTERS, Marignane (FR)

(72) Inventors: Paul Eglin, Roquefort la Bedoule (FR); Remy Huot, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 95 days.

(21) Appl. No.: 17/177,255

(22) Filed: Feb. 17, 2021

(65) Prior Publication Data

US 2021/0291976 A1 Sep. 23, 2021

(30) Foreign Application Priority Data

Mar. 17, 2020 (FR) ..................................... 2002607

(51) Int. Cl.
*B64C 27/80* (2006.01)
*B64C 27/22* (2006.01)
*B64C 27/58* (2006.01)

(52) U.S. Cl.
CPC .............. *B64C 27/80* (2013.01); *B64C 27/22* (2013.01); *B64C 27/58* (2013.01)

(58) Field of Classification Search
CPC .......... B64C 27/80; B64C 27/22; B64C 27/58
See application file for complete search history.

(56) References Cited

U.S. PATENT DOCUMENTS

| | | |
|---|---|---|
| 3,910,144 A | 10/1975 | Hess |
| 8,052,094 B2 | 11/2011 | Roesch |
| 8,113,460 B2 | 2/2012 | Roesch |
| 8,170,728 B2 | 5/2012 | Roesch |
| 8,181,901 B2 | 5/2012 | Roesch |
| 2008/0294305 A1* | 11/2008 | Roesch ................ G05D 1/0858 701/3 |

(Continued)

FOREIGN PATENT DOCUMENTS

| | | | |
|---|---|---|---|
| EP | 2261119 A1 | 12/2010 | |
| EP | 2261119 B1 * | 8/2012 | ............. B64C 27/22 |

(Continued)

OTHER PUBLICATIONS

French Search Report for French Application No. FR2002607, Completed by the French Patent Office, dated Nov. 20, 2020, 9 pages.

*Primary Examiner* — Joshua J Michener
*Assistant Examiner* — Cindi M Curry
(74) *Attorney, Agent, or Firm* — Brooks Kushman P.C.

(57) ABSTRACT

A method of controlling at least a first pitch of a first propeller and a second pitch of a second propeller of a hybrid helicopter, the hybrid helicopter having a thrust control and a yaw control that are configured to generate orders for modifying respectively a mean pitch component and a differential pitch component of the first pitch and of the second pitch, the hybrid helicopter having a collective pitch control for modifying a collective pitch component of main blades of the lift rotor. The method includes a step of: keeping with the control system the first pitch and the second pitch within a control domain that varies as a function of information relating to the collective pitch component.

20 Claims, 4 Drawing Sheets

(56) References Cited

U.S. PATENT DOCUMENTS

2010/0308154 A1* 12/2010 Gemmati ................ B64C 27/22
                                                         244/6
2010/0308178 A1* 12/2010 Gemmati ................ B64C 27/58
                                                         244/230
2018/0346111 A1* 12/2018 Karem .................... B64C 27/72

FOREIGN PATENT DOCUMENTS

FR          2261119  A1    9/1975
FR          2946317  A1    12/2010

* cited by examiner

METHOD OF CONTROLLING PROPELLERS OF A HYBRID HELICOPTER, AND A HYBRID HELICOPTER

CROSS-REFERENCE TO RELATED APPLICATIONS

This application claims priority to French patent application No. FR 20 02607 filed on Mar. 17, 2020, the disclosure of which is incorporated in its entirety by reference herein.

BACKGROUND OF THE INVENTION

(1) Field of the Invention

The present invention relates to a method of controlling propellers of a hybrid helicopter, and also to a hybrid helicopter applying this method. The invention lies in the technical field of control systems for a hybrid helicopter.

The project leading to this invention received funding from the European Union Framework Programme for Research and Innovation Horizon 2020, through the grant agreement CleanSky 2 No. "GAM-FRC-2014-001 Issue E".

(2) Description of Related Art

Due to its specificity and for convenience, one type of rotorcraft may be referred to as a "hybrid helicopter". A hybrid helicopter has an airframe carrying at least one rotary wing provided with a rotor, that rotor being referred to, for convenience, as a "lift rotor" due to a function it performs. The lift rotor participates at least in providing lift for the aircraft, and indeed can also participate in providing forward propulsion for it.

A hybrid helicopter further includes at least one propeller, possibly of the puller propeller type or of the pusher propeller type. For example, the hybrid rotorcraft may be provided with at least two propellers arranged transversely on either side of the fuselage.

Furthermore, a hybrid helicopter includes a power plant for setting in motion each propeller and the lift rotor, optionally continuously except during failure or during testing.

To pilot a hybrid helicopter, a pilot of the hybrid helicopter can operate a first control and a second control for respectively collectively and cyclically controlling the pitch of the blades of the lift rotor, e.g. via a mechanical and/or electrical architecture. The first control is referred to, for convenience, as the "collective pitch control" and often takes the form of a lever referred to as the "collective pitch lever". The second control is referred to, for convenience, as the "cyclic pitch control" and often takes the form of a stick referred to as the "cyclic stick".

In particular on a hybrid helicopter having at least two propellers situated on either side of the fuselage, the pitch of the blades of each propeller is a function of a mean pitch component and of a differential pitch component. Thus, the first pitch of the first blades of a first propeller may be equal to the sum of the mean pitch component plus the differential pitch component, while the second pitch of the second blades of a second propeller may be equal to the mean pitch component minus the differential pitch component. Furthermore, the mean pitch component may be equal to the half-sum of the first and second pitches of the two propellers, while the differential pitch component may be equal to the half-difference of the first and second pitches of the two propellers.

In this situation, the hybrid helicopter includes at least one thrust control suitable for modifying the value of the mean pitch component, e.g. via a mechanical and/or electrical architecture.

For example, the thrust control may be in the form of a lever or of a button that transmits an analog, digital, electrical, or optical signal, to one or more actuators. In one example, such a button may have three discrete states, namely a "beep+" first state requesting an increase in the value of the mean pitch component, a "beep-" second state requesting a reduction in the value of the mean pitch component, and a third state requesting no change in the value of the mean pitch component. The pitches of the blades of the propellers are then increased so long as a pilot positions the button in its first state. In another example, the button may be in the form of a knurled wheel that transmits an analog signal to at least one actuator for the purpose of finely adjusting the mean pitch component for the pitches of the first and second blades.

Furthermore, steering or "directional" control functions, in particular for yaw control, can be performed by using a yaw control suitable for modifying the value of the differential pitch component. For example, such a yaw control may comprise pedals connected via a mechanical and/or electrical architecture to the propellers. The pedals make it possible to modify the value of the differential pitch component.

Examples of hybrid helicopters are disclosed, for example, in Documents U.S. Pat. Nos. 8,181,901, 8,170,728, 8,052,094, and 8,113,460.

The total pitch of the propellers may be bounded in order to guarantee that the hybrid helicopter attains target performance, and/or target maneuverability, and/or target resistance to aerodynamic loads.

To this end, the hybrid helicopter may include members for reducing the authority of the yaw control as the mean pitch component increases, and vice versa. Thus, the same movement of the yaw control induces different variations in the differential pitch component as a function of the current value of the mean pitch component.

In addition, the yaw control may be bounded mechanically and/or via an actuator controlled by a control computer so as to limit its movement. Similarly, the thrust control may be bounded.

In a flight control diagram that, along the abscissa axis, plots the pitch of a first propeller situated on a first side of the aircraft as seen by a pilot of the hybrid helicopter, and, up the ordinate axis, plots the pitch of a second propeller situated on a second side of the hybrid helicopter as seen by the pilot, those pitches can then be kept within a domain delimited by a single envelope. The single envelope may be in the shape of a funnel that tapers as the total pitches increase.

Such teaching is advantageous, but an envelope that makes it possible to achieve not only target performance and target maneuverability but also target resistance to aerodynamic loads at high forward speed can be difficult to define without over-dimensioning the aircraft.

For example, the envelope may be large in size so that the hybrid helicopter can authorize all of the maneuvers that are envisioned. The hybrid helicopter must then be dimensioned to withstand, at high speed, the aerodynamic loads defined by certification regulations for the entire domain covered by such a broad envelope.

Document FR 2 261 119 discloses a hybrid helicopter of that type provided with yaw control means suitable for generating an original order for modifying the yaw attitude of said hybrid helicopter. A thrust control is suitable for modifying the first pitch of the first blades of a first propeller and the second pitch of the second blades of a second propeller by the same amount. In that document, the original order is optimized as a function of the position of the thrust control so as to obtain an optimized yaw control order that is transmitted to said first and second blades.

BRIEF SUMMARY OF THE INVENTION

An object of the present invention is then to propose an innovative method that aims to optimize the dimensioning of a hybrid helicopter.

Thus, the invention provides a method of controlling at least one first propeller and at least one second propeller, which propellers are, for example, placed on either side of a fuselage of a hybrid helicopter, said hybrid helicopter including a lift rotor, which rotor is, for example, arranged above the fuselage, said hybrid helicopter including a control system connected to first blades of the first propeller and to second blades of the second propeller, said hybrid helicopter having a thrust control configured to generate an order for modifying a mean pitch component of a first pitch of the first blades and of a second pitch of the second blades, which order is transmitted to the control system, said hybrid helicopter having a yaw control configured to generate an order for changing a differential pitch component of the first pitch and of the second pitch, which order is transmitted to the control system, and said hybrid helicopter having a collective pitch control for modifying a collective pitch component of a main pitch of the main blades of the lift rotor.

The method includes the following step: keeping with the control system the first pitch and the second pitch within a control domain that varies as a function of information relating to said collective pitch component.

Each order may take the form of an electrical or optical, analog or digital signal, or indeed of a force setting a mechanical channel in motion.

Furthermore, and in an example, said information is an analog, digital, electrical, or optical signal issued by the collective pitch control and directly or indirectly carrying a value of the collective pitch component of the main blades of the lift rotor.

For example, the collective pitch control comprises a lever mounted to pivot relative to a support, an angular sensor measuring an angular position of the lever and issuing a signal that varies as a function of the controlled value of the collective pitch component of the main blades. This signal then represents said information relating to said collective pitch component. In another example, a usual position sensor measures a linear or angular position of a member of a control channel controlling the collective pitch component, the position of said member varying as a function of the position of the collective pitch control and/or of the state of at least one series or trim actuator.

In another example, the control system includes a yaw and/or thrust control mechanical channel provided with a variable-geometry device, which variable-geometry device has a shape that is modifiable mechanically by moving a connection mechanical channel. Movement of the connection mechanical channel is controlled by the collective pitch control. The position of the connection mechanical channel that controls the variable-geometry device then represents said information relating to said collective pitch component, this position varying, de facto, when the collective pitch control is moved.

Regardless of the manner of implementing the method, the first pitch and the second pitch are bounded at each instant so as to be present continuously within a control domain. However, the control system modifies this control domain as a function of the collective pitch component of the main pitch of the main blades of the lift rotor.

Thus, the control domain may cover a set of first and second pitch combinations that are authorized at high speed, e.g. above 150 knots. This set of combinations may be defined by trials, computations, and/or simulations to enable the hybrid helicopter to be controlled at high speed by withstanding aerodynamic loads defined by certification regulations and, for example, by Certification Specifications CS-29.351. At high speed, the control system acts mechanically and/or via actuators to prevent the first pitch and the second pitch of the propellers from reaching combinations not belonging to the first set.

Under other conditions, the control domain covers other sets of first and second pitch combinations as a function of information that varies with the collective pitch component of the main pitch of main blades.

For example, during a phase of flight in autorotation, the control domain may cover another set of authorized first and second pitch combinations. This second set may have combinations that are not authorized by the preceding set since, de facto, the autorotation flight phase takes place at low speed and induces different aerodynamic loads.

Other sets may be considered. For example, for each possible value of the collective pitch component, the control system bounds the first pitch and the second pitch to within a set of combinations that is specific to it.

This method then implements an architecture having three inlets for controlling the first pitch and the second pitch, namely the collective pitch control that enables the control system to define the control domain that is to be complied with, the yaw control and the thrust control that serve to control respectively the differential and the mean pitch components of the propeller blades within the limits of the control domain.

In another aspect, this method may lighten the workload on the pilot during a phase of hovering flight.

The method may also have one or more of the following characteristics.

In one aspect, in which it is possible for the control domain to be bounded by an envelope in a control diagram plotting the first pitch along the abscissa axis and the second pitch up the ordinate axis, and in which said envelope has a shape comprising a closed line, keeping with the control system the first pitch and the second pitch within the control domain may include the following step: keeping with the control system the first pitch and the second pitch within the envelope, said envelope being obtained by transforming a reference envelope as a function of said information.

Any envelope whatsoever may be considered as being a reference envelope.

In a first variant, transforming the reference envelope is obtained by moving the reference envelope in rotation within said control diagram about a center of rotation through an angle that is a function of said information.

For example, said center of rotation is positioned within said control diagram at a first value PAS1CNT of the first pitch and at a second value PAS2CNT of the second pitch, the first pitch and the second pitch respectively taking the first value and the second value during a phase of cruising flight.

Such a variant may tend to limit coupling between the lift rotor and the propellers at high speeds by limiting the deformation of the control domain to around the center of rotation. Conversely, this variant enables maximum coupling to be obtained during a phase of hovering flight.

In a second variant, transforming the reference envelope is obtained by moving the reference envelope in translation within said control diagram through a distance that is a function of said information.

In a third variant, transforming the reference envelope is obtained by deforming the reference envelope within said control diagram as a function of said information.

In another aspect, keeping with the control system the first pitch and the second pitch within a control domain includes the following steps at each iteration:

keeping the first pitch and the second pitch within a first envelope when said information conveys a collective pitch component that is equal to a minimum value;

keeping the first pitch and the second pitch within at least one second envelope when said information conveys a collective pitch component that is equal to an intermediate value that is greater than the minimum value and less than a maximum value; and keeping the first pitch and the second pitch within a third envelope when said information conveys a collective pitch component that is equal to the maximum value.

The method may provide a single second envelope or an infinity of second envelopes lying continuously between the first envelope and the third envelope.

For example, keeping with the control system the first pitch and the second pitch within a control domain includes the following steps at each iteration:

keeping the first pitch and the second pitch within a first envelope when said information conveys a phase of hovering flight;

keeping the first pitch and the second pitch within a second envelope when said information conveys a phase of level flight; and keeping the first pitch and the second pitch within a third envelope when said information conveys a phase of upward flight.

The various flight phases may be identified in usual manner, said information including, for example, the value of one or more parameters enabling the current flight phase to be identified.

In another aspect, the modification in the control domain by the control system may be achieved mechanically, namely via a succession of movable mechanical members, and/or electrically or hydraulically, namely via at least one electric or hydraulic actuator.

Thus, in a first alternative, the control system may include a control computer receiving a thrust control signal issued by the thrust control as well as a yaw control signal issued by the yaw control and a collective pitch control signal issued by the collective pitch control, with said control computer controlling at least one actuator of the control system, and keeping with the control system the first pitch and the second pitch within the control domain then includes a step in which the control computer controls said actuator as a function of at least one law stored in a memory and also as a function of said thrust control signal and of said yaw control signal and of said collective pitch control signal.

In one example, the control computer may include a single law that makes it possible to define a signal to be transmitted to at least one actuator for complying with the order given by a pilot by bounding the first pitch and the second pitch within the appropriate control domain. Such a law may take any usual form such as, for example, a mathematical relationship or a table of values, or a succession of mathematical instructions.

In another example, the control computer may apply a respective law for each possible value of the collective pitch component of the pitch of the first blades.

In a second alternative that is optionally compatible with the above first alternative, the control system may include a variable-geometry mechanical device connected to the collective pitch control and to the yaw control and to a downstream mechanical channel connected to the first propeller and to the second propeller, and keeping with the control system the first pitch and the second pitch within the control domain includes a step in which said collective pitch control modifies said variable geometry of the variable-geometry mechanical device.

For example, such a variable-geometry mechanical device may comprise at least one variable-ratio member, sometimes referred to as a "crank" or as a "bellcrank" or indeed as "deflector means" or "crank means". Such a variable-ratio crank may be controlled mechanically via the collective pitch control and/or via an actuator controlled by the control computer, for example. Document FR 2 946 317 discloses an example of variable-geometry crank means.

In addition to providing a method, the invention also provides a hybrid helicopter provided with at least one first propeller and with at least one second propeller, which propellers are, for example, placed on either side of a fuselage, said hybrid helicopter including a lift rotor, which rotor is, for example, arranged above the fuselage, said hybrid helicopter including a control system connected to first blades of the first propeller and to second blades of the second propeller, said hybrid helicopter having a thrust control configured to generate an order for modifying a mean pitch component of a first pitch of the first blades and of a second pitch of the second blades, which order is transmitted to the control system, said hybrid helicopter having a yaw control configured to generate an order for changing a differential pitch component of the first pitch and of the second pitch, which order is transmitted to the control system, and said hybrid helicopter having a collective pitch control for modifying a collective pitch component of a main pitch of the main blades of the lift rotor.

The control system is configured to apply the method of the invention.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Figure 1:
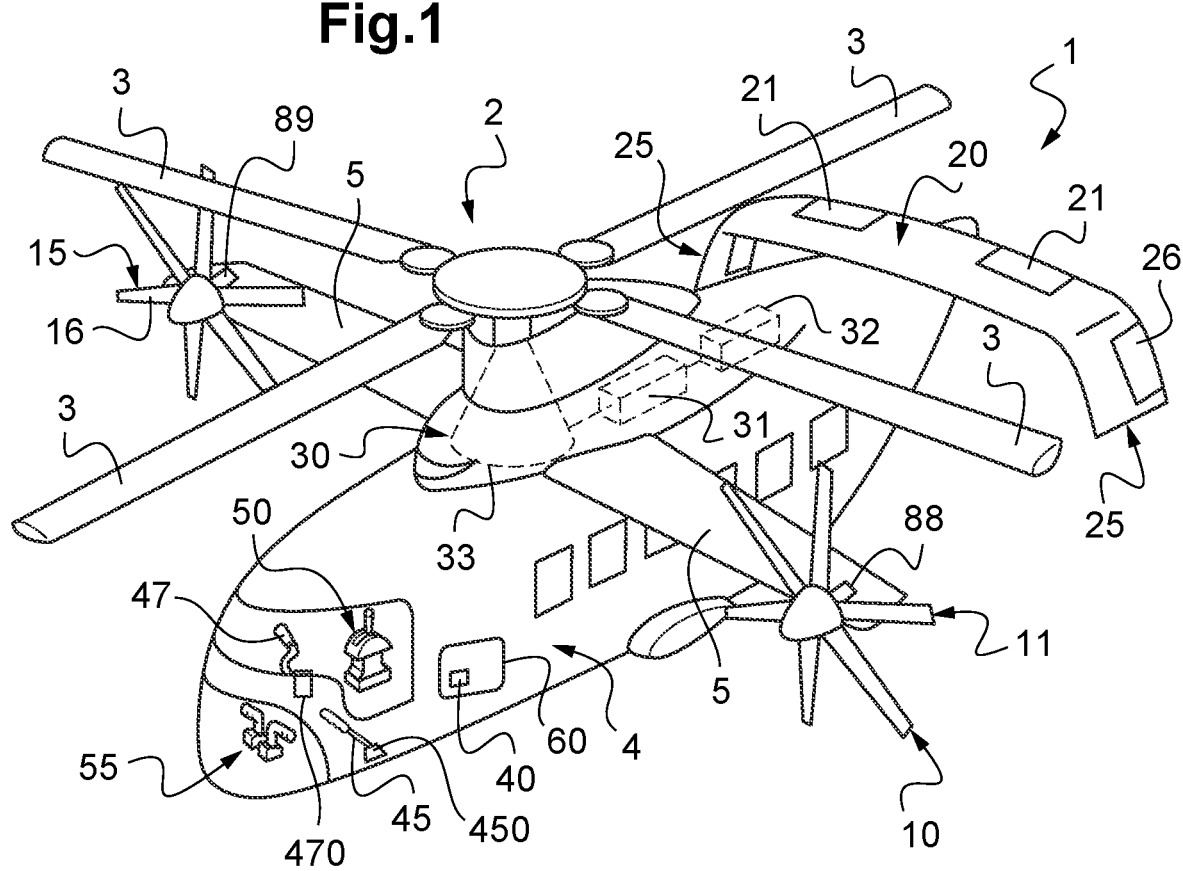
FIG. 1 is a diagrammatic view of a hybrid helicopter of the invention.

FIG. 1 shows a hybrid helicopter 1 of the invention.

This hybrid helicopter 1 has a fuselage 4 above which at least one lift rotor 2 is arranged. The lift rotor 2 is provided with a plurality of blades referred to for convenience as "main blades 3".

In addition, the hybrid helicopter 1 is provided with at least one first propeller 10 and with at least one second propeller 15, the propellers being of the puller type or of the pusher type. The first and second propellers 10, 15 respectively have a plurality of first blades 11 and a plurality of second blades 16. The first propeller 10 and the second propeller 15 may be disposed laterally relative to the fuselage 4, and in particular on either side of an anteroposterior plane of the hybrid helicopter 1. In FIG. 1, the sides on which the first and second propellers 10, 15 are arranged may be reversed. The first and second propellers 10, are optionally carried by a support 5. Such a support 5 may optionally be aerodynamic. For example, the support 5 comprises a wing as shown in FIG. 1. In FIG. 1, the propellers 10, 15 are placed at the leading edge of a wing. In another example, the propellers 10, 15 may be placed at the trailing edge of the wing.

Furthermore, the hybrid helicopter 1 may include surfaces for stabilizing or indeed maneuvering purposes, i.e. stabilizer surfaces and movable control surfaces. For example, for longitudinal (pitch) stability and control, the hybrid helicopter 1 may include at least one substantially horizontal stabilizer 20, optionally provided with movable pitch control surfaces or "elevators" 21. For example, for directional (yaw) stability and control, the hybrid helicopter 1 may include at least one substantially vertical stabilizer 25, optionally provided with movable fins or "rudders" 26. FIG. 1 thus shows a tail assembly that is in the shape of an upside-down U, but the tail assembly may have various shapes without going beyond the ambit of the invention. In another example, the tail assembly may be H-shaped, U-shaped, etc.

Furthermore, the hybrid helicopter 1 includes a power plant 30 for delivering power to the lift rotor 2 and optionally to each propeller 10, 15. For this purpose, the power plant 30 includes at least one engine 31 that is controlled by a usual engine computer 32.

The term "computer" is used below to mean a unit that may, for example, comprise at least one processor and at least one memory, at least one integrated circuit, at least one programmable system, or at least one logic circuit, these examples not limiting the scope given to the expression "computer". The term "processor" may be used equally well to mean a central processing unit (CPU), a graphics processing unit (GPU), a digital signal processor (DSP), a microcontroller, etc.

In addition, for example inside an interconnection system, the power plant 30 may further include at least one gearbox, at least one shaft, and/or at least one member for interconnecting two members in rotation, etc. For example, one or more engines 31 are connected mechanically via one or more mechanical connection channels to a main gearbox 33 that drives the lift rotor 2 in rotation. Furthermore, the main gearbox 33 may be connected mechanically via respective shafts to side gearboxes, one for each of the propellers 10, 15, which side gearboxes are then in turn connected to the corresponding propellers 10, 15.

The speeds of rotation of the outlets of the engine(s) 31, of the propellers 10, 15, of the lift rotor 2, and of the mechanical interconnection system are optionally mutually proportional, with the proportionality ratio optionally being constant regardless of the flight configuration of the hybrid helicopter 1 under normal operating conditions, i.e. except for failure, testing or training situations.

Furthermore, the hybrid helicopter 1 may include various controls for being piloted.

In particular, the hybrid helicopter 1 may include a control system 40 connected to flight controls for collectively and cyclically controlling the pitch of the main blades 3. Such a control system 40 may, for example, include a set of swashplates. Thus, at each instant, the pitch of the main blades 3 may be equal to the sum of a collective pitch that is identical for all of the main blades 3 and of a cyclic pitch that varies as a function of the azimuth position of each main blade 3. The pitch of the main blades 3 is referred to as the "main pitch" so as to be clearly distinguished from the pitches of the other blades.

The hybrid helicopter 1 may then include a collective pitch control 45 that can be operated by a pilot and that acts on at least one mechanical and/or electrical control channel of the control system 40 to cause the main pitch of the main blades 3 to vary collectively, where applicable via the set of swashplates. For example, the collective pitch control 45 may comprise a lever. In addition, the collective pitch control 45 may include a collective pitch sensor 450 that emits an analog, digital, electrical, or optical signal that varies as a function of the position of a moving member. For example, the collective pitch control 45 comprises a lever and a collective pitch sensor 450 including at least one angular position sensor for assessing a position of the lever, such as, for example, a potentiometer. The collective pitch sensor 450 may also be arranged on a moving member jointly with the collective pitch control, e.g. downstream from series actuators and/or trim actuators, as applicable.

Similarly, the hybrid helicopter 1 may include a cyclic pitch control 47 that can be operated by a pilot and that acts on one or more mechanical and/or electrical control channels of the control system to cause the pitch of the main blades 3 to vary cyclically, where applicable via the set of swashplates. In addition, the cyclic pitch control 47 may be provided with a position sensor 470 that emits an analog, digital, electrical, or optical signal that varies as a function of the position of a moving member. For example, the cyclic pitch control 47 comprises a stick and a position sensor 470 including at least two angular position sensors for assessing a position of the stick, such as, for example, potentiometers.

In usual manner, the hybrid helicopter 1 may include controls connected to the control system 40 for controlling the pitch of the first blades 11 and the pitch of the second blades 16. At each instant, the first pitch of the first blades 11 of the first propeller 10 may be equal to the sum of a mean pitch component and of a differential pitch component, while the second pitch of the second blades 16 of the second propeller 15 is equal to the difference between the mean pitch component and the differential pitch component.

Optionally, the hybrid helicopter 1 includes a first measurement sensor 88 for measuring the first value of the first pitch and a second measurement sensor 89 for measuring the second value of the second pitch. For example, the first measurement sensor 88 includes a position sensor that emits an analog, digital, electrical, or optical signal that varies as a function of the position of a control shaft for controlling the pitch of the first blades 11. Similarly, the second sensor 89 may include a position sensor that emits an analog, digital, electrical, or optical signal that varies as a function of the position of a control shaft for controlling the pitch of the second blades 16. Each position sensor may be of a usual type and, for example, comprise a speed sensor making it possible to obtain a position by integration, a potentiometer, etc.

In usual manner, the hybrid helicopter 1 may include a thrust control 50 that can be operated by a pilot and that acts on one or more mechanical and/or electrical control channels of the control system 40 to cause the mean pitch component to vary, e.g. so as to control a forward speed of the hybrid helicopter 1. FIG. 1 shows a thrust control 50 of the lever type, but the thrust control may also, for example, take the form of a button generating a digital signal, or of a knurled wheel generating an analog signal.

Similarly, the hybrid helicopter 1 may include a yaw control 55 that can be operated by a pilot and that acts on one or more mechanical and/or electrical control channels of the control system 40 to cause the differential pitch component of the pitch of the first blades 11 and of the pitch of the second blades 16 to vary. The yaw control may, for example, take the form of pedals.

Furthermore, the control system 40 may include a control computer 60 that is in communication at least with the thrust control 50 so as to apply the method of the invention and optionally also with the first measurement sensor 88, with the second measurement sensor 89 and/or with the collective pitch sensor 450, or indeed with one or more above-mentioned controls.

Figure 2:
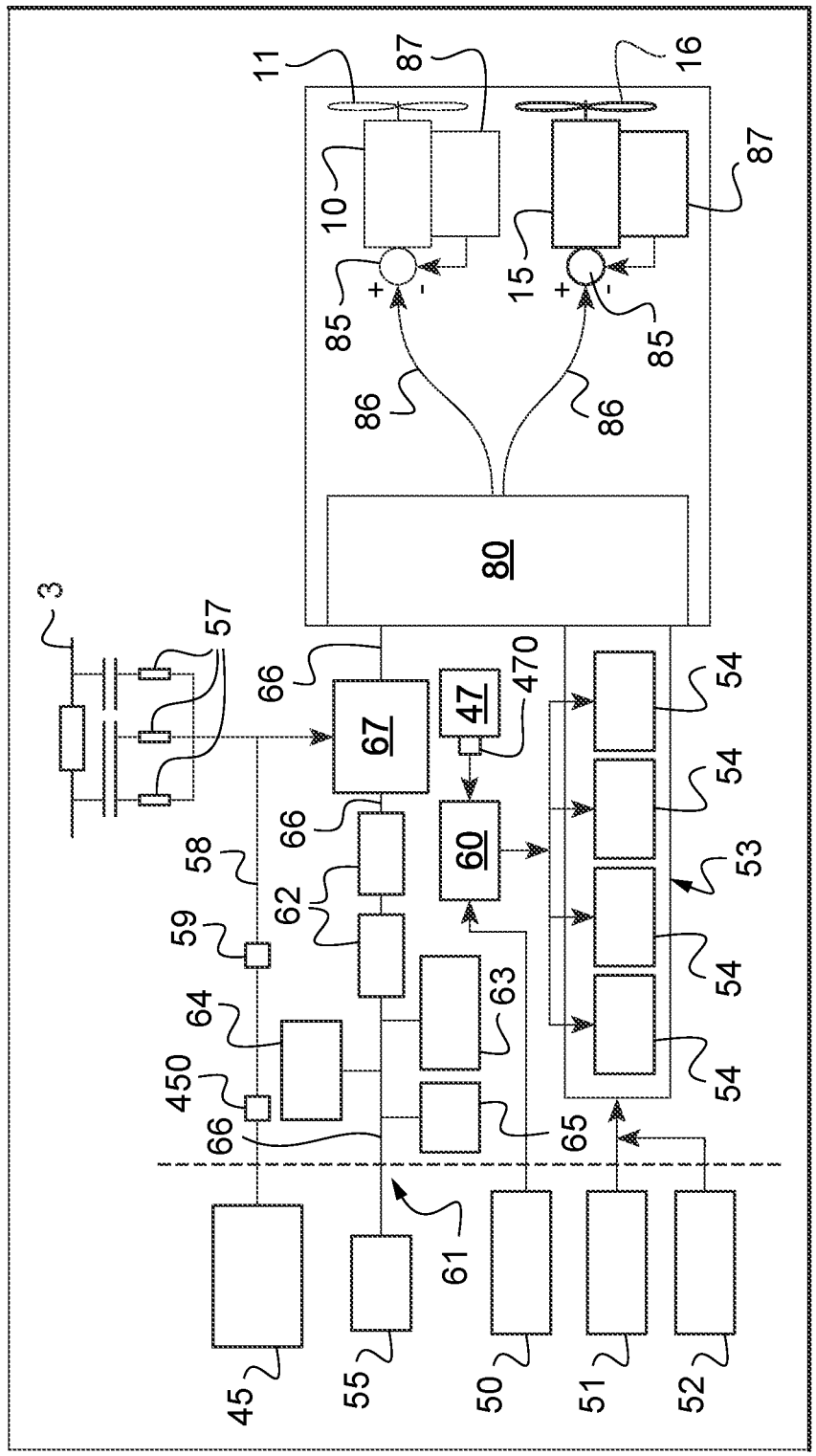
FIG. 2 is a diagrammatic view of a control system for controlling the propellers of a hybrid helicopter of the invention.

FIG. 2 shows an example of a control system 40 for controlling the propellers 10, 15.

In this control system 40, the collective pitch control 45 is connected to a collective pitch control channel 58 of the control system 40 for controlling the collective pitch component of the main blades 3. For example, the collective pitch control 58 includes at least three servo-controls 57 hinged to a non-rotary swashplate of the set of swashplates, this set of swashplates including a rotary swashplate connected via pitch connecting rods to a pitch lever of each main blade 3. Optionally, the collective pitch control channel 58 includes at least one actuator 59 controlled by the control computer 60 that is connected to a fluid flow valve of each servocontrol via usual links. In addition, the collective pitch control channel 58 may also include usual links that are connected mechanically to the collective pitch control 45. The collective pitch control channel 58 may also include at least one collective pitch sensor 450 that is in communication with the control computer 60, the collective pitch sensor 450 emitting a signal that varies with the value of the collective pitch component. For example, such a collective pitch sensor 450 is arranged on a mixing unit (not shown).

In this control system 40, the yaw control 55 is connected via a mechanical first main channel 61 to a mechanical mixing unit 80 of a downstream mechanical channel 70. This mechanical first main channel 61 may include at least one rigid link 66, at least one yaw series actuator 62, and members 63 generating friction forces. For example, a rigid link may take the form of a connecting rod or of some equivalent means. A usual device 64 may also damp the movements of the yaw control 55. At least one yaw trim actuator 65 may be arranged in parallel with the mechanical first main channel 61. The yaw trim actuator(s) 65 and the yaw series actuator(s) 62 are controlled by the control computer 60.

In addition, the mechanical first main channel 61 may include a variable-geometry mechanical device 67 that, for example, makes it possible to modify an order given by the yaw control 55 as a function of an action to move the collective pitch control 45 via movement of the collective pitch control channel 58 or of a dedicated mechanical channel and/or of an action to move the thrust control 50 directly or via the control computer 60. The control computer 60 may also act on an order given by the yaw control 55, e.g. by controlling the yaw series actuators 62.

In addition, for each propeller, 10, 15, the mixing unit 80 is coupled to a control rod for controlling a hydraulic valve 85 via a linkage secondary channel 86 of the downstream linkage channel 70, and, for example, via a ball control. As a function of the orders given by the pilot, the control rods are moved so that the hydraulic valves 85 connect servo-controls to the hydraulic circuit of the hybrid helicopter 1 so as to modify the first pitch of the first blades 11 and the second pitch of the second blades 16. A modulation system 87 may modify the orders transmitted by the mixing unit 80. For example, such a modulation system 87 includes a repeater rod for the hydraulic valve 85, which rod can be moved by an actuator under order of the control computer 60.

Furthermore, the thrust control 50 is coupled to the mixing unit 80, e.g. via a linkage second main channel 53, the linkage second main channel 53 including at least one thrust series actuator 54 connected mechanically to the mixing unit 80. Each thrust series actuator 54 may receive an analog, digital, electrical, or optical signal issued by the control computer 60 under order from the thrust control 50. As a result, the thrust control 50 issues an analog, digital, electrical, or optical signal that is transmitted to the control computer 60, which control computer 60 controls one or more thrust series actuators 54 accordingly.

Optionally, a backup control 51 may also be put in place, and, for example, a backup control connected mechanically to the linkage second main channel 53. In one example, a lever may move the linkage second main channel 53.

Optionally, a movement prevention control 52 may also be considered for preventing the backup control 51 from moving.

Under such conditions, the mixing unit 80 sums the order for modifying the mean pitch component that is given by the thrust control 50 via the thrust series actuators 54, and the order for changing the differential pitch component that is given by the yaw control 55. Orders for modifying the mean pitch component and for changing the differential pitch component may also be issued by the control computer and transmitted to the various series and trim actuators 62, 54, 65, or indeed to the device 87. More precisely, when the thrust control 50 is moved, a control signal is transmitted to the control computer 60. The control computer 60 then optionally controls one or more thrust series actuators 54 for setting in motion the mixing unit 80 in order to modify the mean pitch components of the first blades 11 and of the second blades 16.

Figure 3:
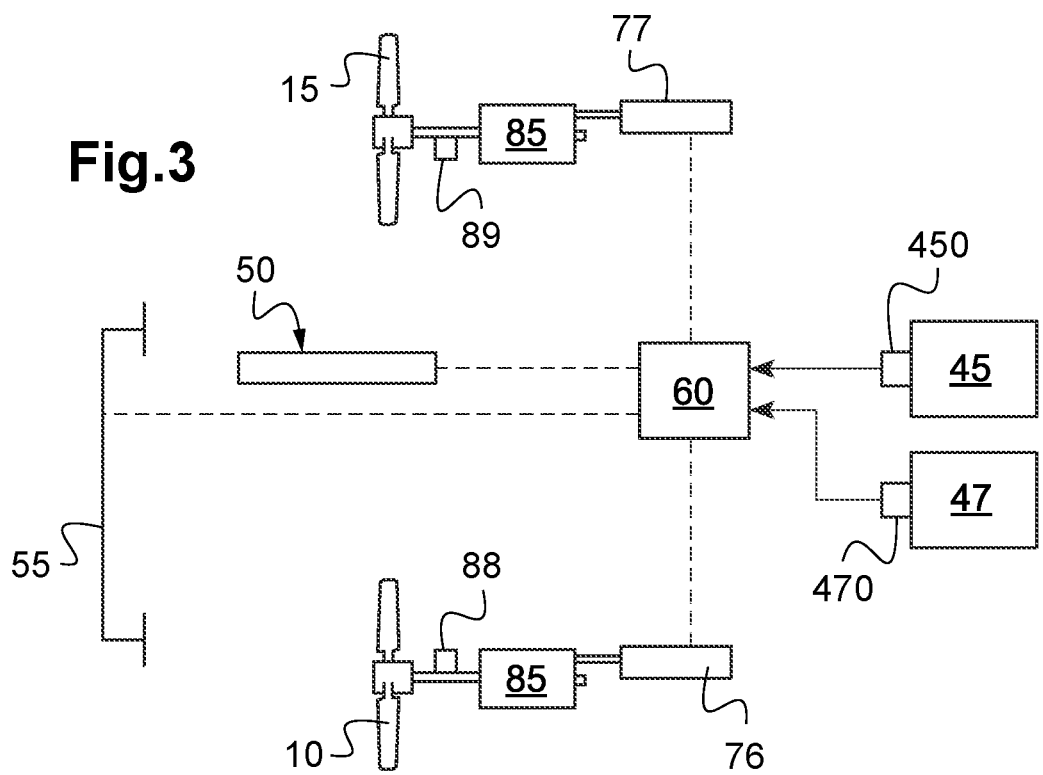
FIG. 3 is a diagrammatic view of a control system for controlling the propellers of a hybrid helicopter of the invention.

FIG. 3 shows another example of a control system for controlling the propellers 10, 15.

In this example, the yaw control 55, the thrust control 50, the collective pitch control 45 and the cyclic pitch control 47 communicate with the control computer 60. The control computer 60 is in communication with actuators 76, 77 that are connected to respective ones of the hydraulic valves 85.

The control computer 60 then applies one or more laws stored in a memory for controlling the actuators 76, 77 as a function of the signals issued by the yaw control 55, by the thrust control 50, and by the collective pitch control 45, or indeed by the cyclic pitch control 47.

The control systems of FIGS. 2 and 3 are given by way of illustration.

Figure 4:
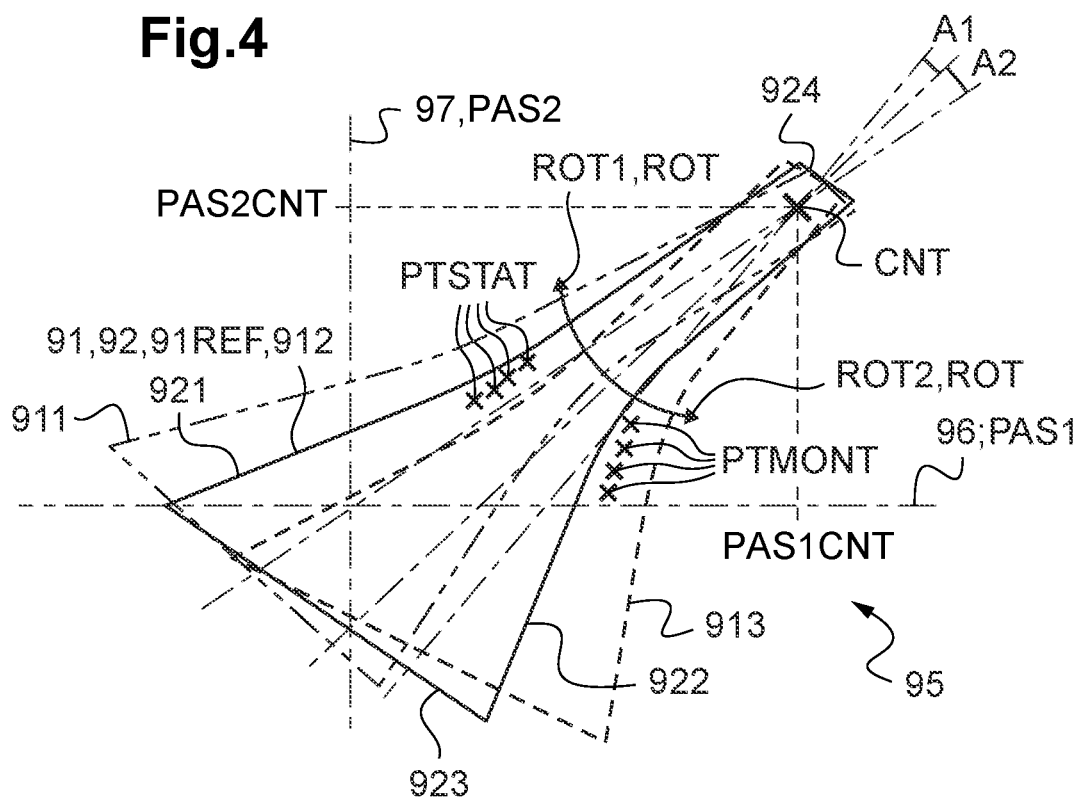
FIG. 4 is a control diagram showing a first variant of the method of the invention.

In another aspect, FIG. 4 shows a control diagram 95 that plots the first pitch RAE' of the first blades 11 along the abscissa axis 96, and the second pitch PAS2 of the second blades up the ordinate axis 97.

In the method of the invention, at each iteration, the control system 40 maintains the first pitch PAS1 and the second pitch PAS2 within a control domain 90. However, the control domain 90 varies under control from the control system 40 as a function of information relating to said collective pitch component.

At each iteration, the control system 40 bounds the first pitch PAS1 and the second pitch PAS2 by keeping them within the control domain 90 that is authorized at said iteration, the control domain 90 varying from one iteration to another concomitantly with the collective pitch component of the main pitch of the main blades 3.

In the control diagram 95, at each iteration of the method, the control domain 90 may be bounded by the control system 40 by a current envelope 91 that comprises a closed line 92. For example, such a closed line 92 comprises a left segment 921 and a right segment 922 that bound the differential pitch components of the first pitch PAS1 and of the second pitch PAS2, as well as a lower segment 923 and an upper segment 924 that bound the mean pitch components of the first pitch PAS1 and of the second pitch PAS2. The closed line 92 therefore, in succession, comprises the left segment 921, the upper segment 924, the right segment 922, and the lower segment 923 that joins back up with the left segment 921.

For example, the first pitch PAS1 and the second pitch PAS2 are, in particular, kept within a first envelope 911 when said information conveys a collective pitch component that is equal to a minimum value, and, for example, during a phase of hovering flight.

The first envelope 911 enables the current operating point, defined by the first pitch PAS1, and the current second pitch PAS2 to be positioned in positions PTSTAT. For example, these positions PTSTAT are, during a phase of hovering flight, substantially at the center of the first envelope 911.

For example, the first pitch PAS1 and the second pitch PAS2 are, in particular, kept within a second envelope 912 when said information conveys a collective pitch component lying between the minimum value and a maximum value, e.g. during a phase of level flight. The maximum value is greater than the minimum value.

For example, the first pitch PAST and the second pitch PAS2 are, in particular, kept within a third envelope 913 when said information conveys a collective pitch component equal to the maximum value, and, for example, during a phase of upward flight and in particular during a phase of upward flight controlled by increasing the collective pitch component of the main blades 3.

The third envelope 913 enables the operating point to be positioned in the positions PTMONT during a phase of upward flight, close to the center of the third envelope 913.

At each iteration, the current envelope 91 may be obtained by transforming a reference envelope 91REF as a function of the collective pitch component, e.g. the second envelope 912 in the example that is given. The reference envelope may alternatively be considered as being the current envelope at the preceding iteration.

In FIG. 4, transforming a reference envelope 91REF is performed by moving the reference envelope 91REF in the control diagram 95 in rotation ROT about a center of rotation CNT through an angle A1, A2 that is a function of said information. The center of rotation CNT is positioned at a first value PAS1CNT of the first pitch and at a second value PAS2CNT of the second pitch, the first pitch and the second pitch respectively taking the first value PAS1CNT and the second value PAS2CNT during a phase of cruising flight.

The reference envelope 91REF is associated with information relating to a reference collective pitch component. If the collective pitch component decreases, the current envelope is obtained by moving the reference envelope 91REF in rotation ROT1 through an angle A2 in the clockwise direction. Conversely, if the collective pitch component increases, the current envelope is obtained by moving the reference envelope 91REF in rotation ROT2 through an angle A1 in the counterclockwise direction.

Figure 5:
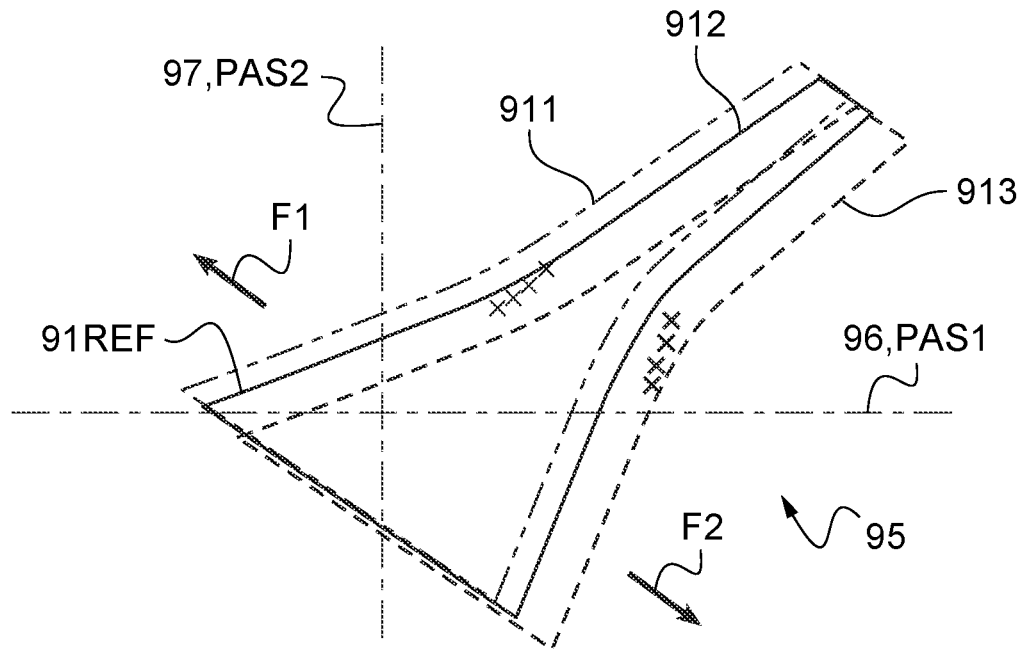
FIG. 5 is a control diagram showing a second variant of the method of the invention.

In FIG. 5, transforming a reference envelope 91REF is obtained by moving the reference envelope 91REF in translation F1, F2 within said control diagram 95 through a distance that is a function of said information.

The reference envelope 91REF is associated with information relating to a reference collective pitch component. If the collective pitch component decreases, the current envelope is obtained by moving the reference envelope in translation F1. Conversely, if the collective pitch component increases, the current envelope is obtained by moving the reference envelope 91REF in translation F2.

Figure 6:
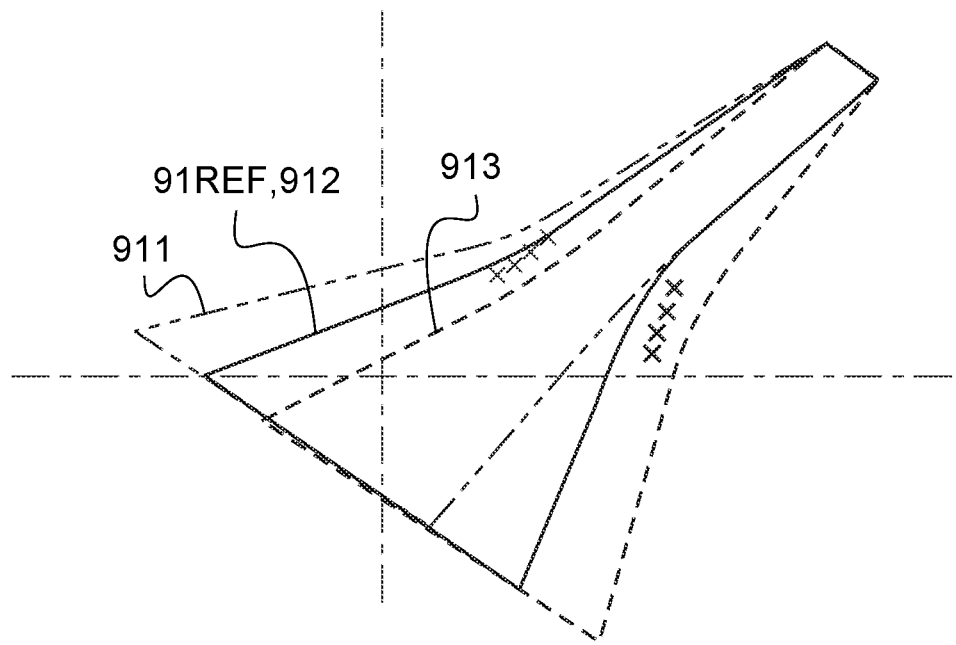
FIG. 6 is a control diagram showing a third variant of the method of the invention.

In FIG. 6, transforming a reference envelope 91REF is obtained by deforming the reference envelope 91REF within said control diagram 95 as a function of said information.

Independently of the nature of the transformation, transforming a reference envelope 91REF is effected by the control system 40 as a function of information that is an image of the value of the collective pitch component.

In the variant of FIG. 3, the control computer 60 controls the actuators 76, 77 as a function of at least one law that is stored in a memory, and also as a function of a thrust control signal issued by the thrust control, of a yaw control signal issued by the yaw control, and of a collective pitch control signal issued by the collective pitch control.

Said at least one law makes it possible to bound the orders issued via the thrust control signal and the yaw control signal within the control domain dependent on the collective pitch control signal.

In the variant shown in FIG. 2, the control system 40 includes a variable-geometry mechanical device 67 that has a geometry that changes as a function of a movement of the collective pitch control 45. The change in the geometry of the variable-geometry mechanical device 67 enables the authorized control domain to be caused to vary.

Additionally, or alternatively, the control computer 60 applies at least one law for controlling the thrust series actuators 54 and/or the yaw series actuators 67 and/or the modulation systems 87 to this end.

Naturally, the present invention may be subjected to numerous variations as to its implementation. Although several implementations are described above, it should readily be understood that it is not conceivable to identify exhaustively all possible implementations. It is naturally possible to envisage replacing any of the means described by equivalent means without going beyond the ambit of the present invention as claimed.

What is claimed is:

1. A method of controlling at least one first propeller and at least one second propeller of a hybrid helicopter, the hybrid helicopter including a lift rotor, the hybrid helicopter including a control system connected to first blades of the first propeller and to second blades of the second propeller, the hybrid helicopter having a thrust control configured to generate an order for modifying a mean pitch component of a first pitch of the first blades and of a second pitch of the second blades, which order is transmitted to the control system, the hybrid helicopter having a yaw control configured to generate an order for changing a differential pitch component of the first pitch and of the second pitch, which order is transmitted to the control system, and the hybrid helicopter having a collective pitch control for modifying a collective pitch component of a main pitch of the main blades of the lift rotor;

wherein the method includes the following step: keeping with the control system the first pitch and the second pitch within a control domain that varies as a function of information relating to the collective pitch component.

2. The method according to claim 1, wherein, the control domain is bounded by an envelope in a control diagram plotting the first pitch along the abscissa axis and the second pitch up the ordinate axis, and the envelope having a shape comprising a closed line, keeping with the control system the first pitch and the second pitch within the control domain includes the following step:

keeping with the control system the first pitch and the second pitch within the envelope, the envelope being obtained by transforming a reference envelope as a function of the information.

3. The method according to claim 2, wherein transforming the reference envelope is obtained by moving the reference envelope in rotation within the control diagram about a center of rotation through an angle that is a function of information.

4. The method according to claim 3, wherein the center of rotation is positioned within the control diagram at a first value of the first pitch and at a second value of the second pitch, the first pitch and the second pitch respectively taking the first value and the second value during a phase of cruising flight.

5. The method according to claim 2, wherein transforming the reference envelope is obtained by moving the reference envelope in translation within the control diagram through a distance that is a function of information.

6. The method according to claim 2, wherein transforming the reference envelope is obtained by deforming the reference envelope within the control diagram as a function of information.

7. The method according to claim 1, wherein keeping with the control system, the first pitch and the second pitch within the control domain includes the following steps at each iteration:

keeping the first pitch and the second pitch within a first envelope when the information conveys a collective pitch component that is equal to a minimum value;

keeping the first pitch and the second pitch within at least one second envelope when the information conveys a collective pitch component that is equal to an intermediate value that is greater than the minimum value and less than a maximum value; and keeping the first pitch and the second pitch within a third envelope when the information conveys a collective pitch component that is equal to the maximum value.

8. The method according to claim 1, wherein keeping with the control system, the first pitch and the second pitch within a control domain includes the following steps at each iteration:

keeping the first pitch and the second pitch within a first envelope when the information conveys a phase of hovering flight;

keeping the first pitch and the second pitch within a second envelope when the information conveys a phase of level flight; and keeping the first pitch and the second pitch within a third envelope when the information conveys a phase of upward flight.

9. The method according to claim 1, wherein, with the control system including a control computer receiving a thrust control signal issued by the thrust control as well as a yaw control signal issued by the yaw control and a collective pitch control signal issued by the collective pitch control, and with the control computer controlling at least one actuator of the control system, keeping with the control system the first pitch and the second pitch within the control domain includes a step in which the control computer controls the actuator as a function of at least one law stored in a memory and also as a function of the thrust control signal and of the yaw control signal and of the collective pitch control signal.

10. The method according to claim 1, wherein the control system includes a variable-geometry mechanical device connected to the collective pitch control and to the yaw control and to a downstream mechanical channel connected to the first propeller and to the second propeller, and keeping with the control system the first pitch and the second pitch within the control domain includes a step in which the collective pitch control modifies the variable geometry of the variable-geometry mechanical device.

11. A hybrid helicopter provided with at least one first propeller and with at least one second propeller, the hybrid helicopter including a lift rotor, the hybrid helicopter including a control system connected to first blades of the first propeller and to second blades of the second propeller, the hybrid helicopter having a thrust control configured to generate an order for modifying a mean pitch component of a first pitch of the first blades and of a second pitch of the second blades, which order is transmitted to the control system, the hybrid helicopter having a yaw control configured to generate an order for changing a differential pitch component of the first pitch and of the second pitch, which order is transmitted to the control system, and the hybrid helicopter having a collective pitch control for modifying a collective pitch component of a main pitch of the main blades of the lift rotor;

wherein the control system is configured to apply the method according to claim 1.

12. A method of controlling a first propeller and a second propeller of a hybrid helicopter, the hybrid helicopter including a lift rotor, the hybrid helicopter including a control system connected to first blades of the first propeller and to second blades of the second propeller, the hybrid helicopter having a thrust control configured to generate an order for modifying a mean pitch component of a first pitch of the first blades and of a second pitch of the second blades, which order is transmittable to the control system, the hybrid helicopter having a yaw control configured to generate an order for changing a differential pitch component of the first pitch and of the second pitch, which order is transmittable to the control system, and the hybrid helicopter having a collective pitch control for modifying a collective pitch component of a main pitch of the main blades of the lift rotor;

wherein the method includes the following step: controlling the first pitch and the second pitch within a control domain that varies as a function of the collective pitch component.

13. The method according to claim 12,
wherein, the control domain is bounded by an envelope in a control diagram plotting the first pitch along the abscissa axis and the second pitch up the ordinate axis, and the envelope having a shape comprising a closed line, and controlling the control system the first pitch and the second pitch within the control domain includes the following step:
keeping with the control system the first pitch and the second pitch within the envelope, the envelope being obtained by transforming a reference envelope as a function of the information.

14. The method according to claim 13,
wherein transforming the reference envelope is obtained by moving the reference envelope in rotation within the control diagram about a center of rotation through an angle that is a function of information.

15. The method according to claim 14,
wherein the center of rotation is positioned within the control diagram at a first value of the first pitch and at a second value of the second pitch, the first pitch and the second pitch respectively taking the first value and the second value during a phase of cruising flight.

16. The method according to claim 13,
wherein transforming the reference envelope is obtained by moving the reference envelope in translation within the control diagram through a distance that is a function of information.

17. The method according to claim 13,
wherein transforming the reference envelope is obtained by deforming the reference envelope within the control diagram as a function of information.

18. A method of controlling at least one first propeller and at least one second propeller of a hybrid helicopter, the hybrid helicopter including a lift rotor, the hybrid helicopter including a control system connected to first blades of the first propeller and to second blades of the second propeller, the hybrid helicopter having a thrust control configured to generate an order for modifying a mean pitch component of a first pitch of the first blades and of a second pitch of the second blades, which order is transmitted to the control system, the hybrid helicopter having a yaw control configured to generate an order for changing a differential pitch component of the first pitch and of the second pitch, which order is transmitted to the control system, and the hybrid helicopter having a collective pitch control for modifying a collective pitch component of a main pitch of the main blades of the lift rotor;
wherein the method includes the following step: keeping with the control system the first pitch and the second pitch within a control domain that varies as a function of information relating to the collective pitch component; and
wherein, with the control system including a control computer receiving a thrust control signal issued by the thrust control as well as a yaw control signal issued by the yaw control and a collective pitch control signal issued by the collective pitch control, and with the control computer controlling at least one actuator of the control system, keeping with the control system the first pitch and the second pitch within the control domain includes a step in which the control computer controls the actuator as a function of at least one law stored in a memory and also as a function of the thrust control signal and of the yaw control signal and of the collective pitch control signal, or
wherein the control system includes a variable-geometry mechanical device connected to the collective pitch control and to the yaw control and to a downstream mechanical channel connected to the first propeller and to the second propeller, and keeping with the control system the first pitch and the second pitch within the control domain includes a step in which the collective pitch control modifies the variable geometry of the variable-geometry mechanical device.

19. The method according to claim 18,
wherein, the control domain is bounded by an envelope in a control diagram plotting the first pitch along the abscissa axis and the second pitch up the ordinate axis, and the envelope having a shape comprising a closed line, keeping with the control system the first pitch and the second pitch within the control domain includes the following step:
keeping with the control system the first pitch and the second pitch within the envelope, the envelope being obtained by transforming a reference envelope as a function of the information.

20. The method according to claim 19,
wherein transforming the reference envelope is obtained by moving the reference envelope in rotation within the control diagram about a center of rotation through an angle that is a function of information.

* * * * *